Jan. 11, 1927.  D. R. LIMBERS  1,614,137
BRAKE FOR SLEDS
Filed Feb. 24, 1926
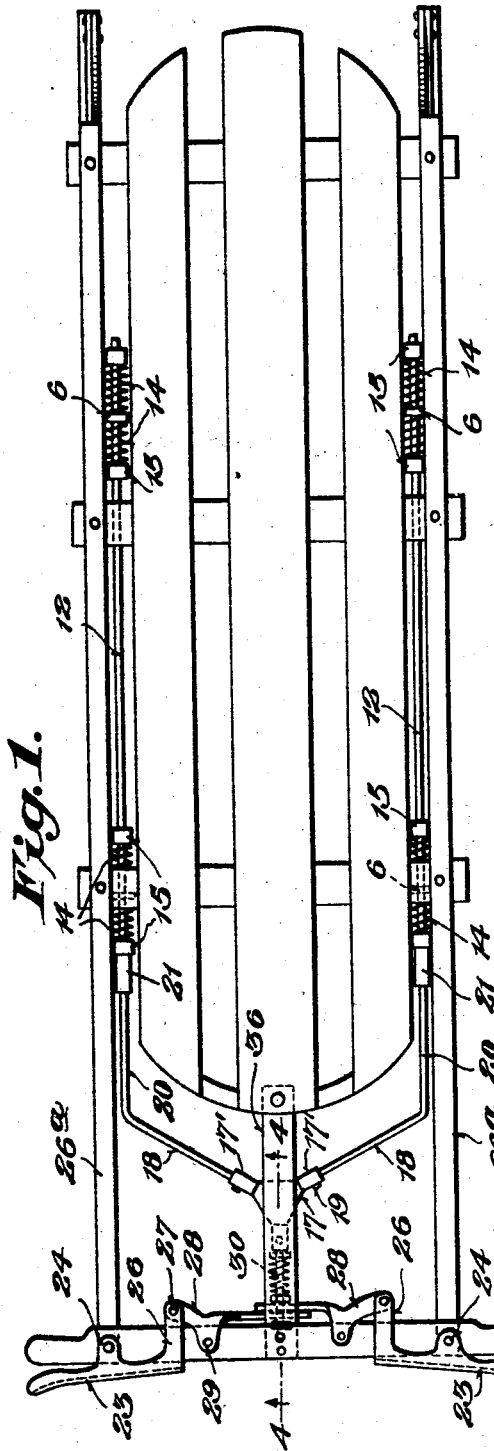
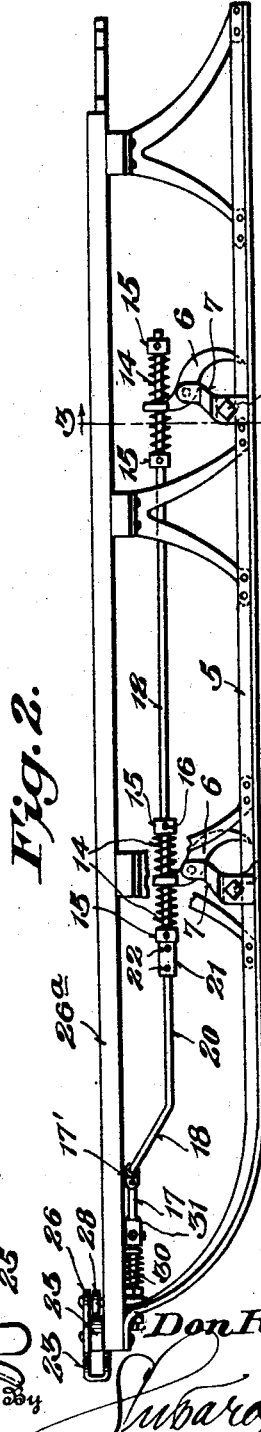
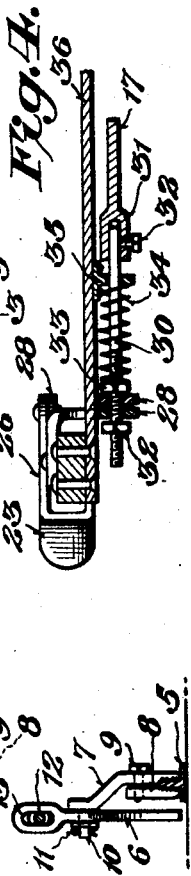
Inventor
Don R. Limbers, Patented Jan. 11, 1927.

1,614,137

UNITED STATES PATENT OFFICE.

DON R. LIMBERS, OF NUTTER FORT, WEST VIRGINIA.

BRAKE FOR SLEDS.

Application filed February 24, 1926. Serial No. 90,347.

This invention relates to sleds, and has for its object to provide an improved brake mechanism therefor which may be conveniently mounted upon a sled of ordinary construction without requiring any changes therein, for the mounting of the brake mechanism, and which mechanism will operate effectually to check and stop the travel of the sled in a gradual and satisfactory manner.

The brake mechanism is mounted beneath the top of the sled so as not to interfere with the user of the sled in any manner whatsoever, while at the same time the hand control of the brake is conveniently accessible for operation by either or both hands of the occupant of the sled.

With these and other objects in view, the present invention consists in the combination and arrangement of parts as will be hereinafter more fully described, illustrated in the accompanying drawings and particularly pointed out in the appended claims, it of course being understood that changes in the form, proportion, size and minor details may be made, within the scope of the claims, without departing from the spirit or sacrificing any of the advantages of the invention.

In the drawing:

Figure 1 is a top plan view of a sled having the brake mechanism of the present invention applied thereto.

Figure 2 is a side elevation of Figure 1.

Figure 3 is an enlarged detail sectional view on the line 3—3 of Figure 2.

Figure 4 is an enlarged detail sectional view on the line 4—4 of Figure 1.

In the accompanying drawing I have shown a sled of conventional form merely for illustrative purposes and it will of course be understood that the details of construction of the sled may vary widely without affecting the present invention, because the invention resides in the brake mechanism and not in the sled.

In carrying out the present invention I mount upon each of the sled runners 5, shown in Figure 3 of the drawing as an inverted T-bar, one or more brake members 6, two such brake members being shown upon each of the sled runners. Each brake member is in the nature of a dog having a downturned pointed hook portion to engage the snow or ice bed on which the sled is travelling. The brake member is pivoted between its ends upon a bracket 7 which rises from and is secured to the upstanding shank portion of the sled runner, upon which the bracket is secured by a clamp member 8 and a bolt or other fastening 9 extending through the bracket and the clamp member. The upper portion of the bracket inclines inwardly and is provided with a lateral pintle or projection 10 on which the brake member 6 is pivoted, there being a cotter 11 or other means for holding the brake member upon the pivoted pin 10.

The brake members 6 at each side of the sled are simultaneously actuated through the medium of a brake rod 12 which passes through an elongated eye 13 in the upper end of each brake member. Shock absorbing springs 14 encircle the brake rod and bear against opposite sides of the upper ends of the brake members, and also bear at the outer ends against collars or abutments 15 adjustably secured upon the brake rod by suitable set screws 16.

The brake rods 12 are connected at their front ends by a cross-head made up of a bracket 17 having rearwardly diverged sockets 17' receiving rods 18 which are secured to the sockets by set screws 19. The rods 18 diverge rearwardly and incline downwardly, and each is provided with an arm 20 in alignment with the adjacent brake rod 12 and received within a socket 21 extending forwardly from the adjacent collar or abutment 15, a suitable set screw 22 being employed to rigidly connect the arm 20 with the socket 21. As thus far described it will be seen that the brake members 6 at opposite sides of the sled are connected for simultaneous operation by the connecting means which includes the brake rod members 12, 20 and 18 which are in turn connected by the bracket 17.

For the hand control of the brake rods, I provide duplicate hand levers 23, each lever being fulcrumed at 24 between its ends upon the guide bar 25 which extends across and connects the side beams 26ᵃ of the sled. Each hand lever 23 is in the form of a channel in cross section as best shown in Figure 4 of the drawing so as to embrace the top and bottom of the guide bar 25, the hand lever being disposed in front of the guide bar so that the end of the guide bar and the hand lever may be gripped by one hand of the operator to swing the lever on its fulcrum 24. At the inner end of each hand lever there is a rearwardly directed arm 26 extending across the top of the guide bar 25 and pivoted at 27 to one end of a bell crank lever 28 which is fulcrumed intermediate of its ends at 29 upon the top of the guide bar 25. The bell cranks 28 overlap one another across the rear of the guide bar 25 and are provided with registered slots to receive a connecting bar 30 which has its rear end received within a socket 31 upon the front of the bracket 17, there being a set screw 32 to rigidly and adjustably connect the rod 30 and the socket 31. The front end portion of the bar 30 is screw threaded and nuts 32 and 33 are provided upon the screw threaded portion at the front and rear of the overlapped bell crank portions 28 so as to form stops or abutments whereby the connecting rod 30 will be moved endwise by manipulation of either or both of the hand levers 23, which of course will result in endwise movement of the brake rods 12 and consequent operation of the brake members 6 to thrust the lower pointed ends into the snow or ice on which the sled is travelling, thereby to check and stop the movement of the sled. The springs 14 permit the necessary yielding of the brake members 6 so as to prevent the latter from hanging in stones or other obstructions and also operate to absorb shocks and bring the sled gradually to a full stop or merely check the sliding movement of the sled.

For the purpose of maintaining the brake rod mechanism at its forward limit so as to maintain the lower ends of the brake members 6 in inoperative position, a spring 34 is provided upon the rod 30 with its rear end bearing against a bracket 35 secured to the underside of the part 36 of the top of the sled and slotted to permit of the necessary sidewise play of the connecting rod. At its front end, the spring 34 bears against the adjacent nut 33 whereby the rod 30 is yieldably maintained at its forward limit and the brake members 6 are yieldably maintained in elevated inoperative positions.

What is claimed is:

1. The combination with a sled, of a bracket upon one of the sled runners, a swinging brake member pivoted upon the bracket, a brake rod associated with the brake member and carrying shock absorbing springs bearing against opposite sides of the brake member, and operating means for actuating the brake rod.

2. The combination with a sled, of a bracket upon one of the sled runners, a brake member pivoted between its ends upon the bracket and provided with a slotted upper end, a brake rod extending through the slot of the brake member, abutments upon the brake rod and at opposite sides of the brake member, compression springs embracing the brake rod at opposite sides of the brake member and bearing at opposite ends against the brake member and the respective abutments, and means for moving the brake rod endwise.

3. The combination with a sled, of brackets rising from the sled runners, swinging brake members pivoted upon the brackets, brake rods associated with the brake members at respective sides of the sled, shock absorbers between the brake rods and the brake members, a cross-head connecting the front ends of the brake rods, a hand lever mounted upon the front portion of the sled, a bell crank actuated by the hand lever, and a connecting rod between the bell crank and the cross-head.

4. The combination with a sled, of brackets rising from the sled runners, swinging brake members pivoted upon the brackets, brake rods associated with the brake members at respective sides of the sled, a cross-head connecting the front ends of the brake rods, a hand lever mounted upon the front portion of the sled, a bell crank actuated by the hand lever, a connecting rod between the bell crank and the cross-head, a bracket depending from a top part of the sled and having an opening in which the connecting rod works, and a coiled spring embracing the connecting rod and bearing against the bracket and connected with the connecting rod to yieldably maintain the brake members in an elevated and inoperative position.

5. The combination with a sled, of pivotally mounted brake members at opposite sides of the sled, brake rods associated with the brake members at each side of the sled, a cross-head connecting the front ends of the brake rods, hand operated control means including overlapped levers, a connecting rod secured to the cross-head and extending through openings in the overlapped portions of the levers, nuts upon the connecting rod adjacent and at opposite sides of the overlapped lever portions, a bracket depending from a top portion of the sled and having an opening receiving the connecting rod, and a compression spring embracing the connecting rod and bearing at one end against the bracket and at its other end against the nut at the rear of the overlapped lever portions.

DON R. LIMBERS.